US005447205A

United States Patent [19]

Thurler

[11] Patent Number: 5,447,205

[45] Date of Patent: Sep. 5, 1995

[54] DRILL ADJUSTMENT MECHANISM FOR A HAMMER DRILL

[75] Inventor: James Thurler, Pickens, S.C.

[73] Assignee: Ryobi Motor Products, Pickens, S.C.

[21] Appl. No.: 173,827

[22] Filed: Dec. 27, 1993

[51] Int. Cl.[6] .......... B23B 45/02

[52] U.S. Cl. .......... 173/48; 173/13; 173/216; 173/217

[58] Field of Search .......... 173/13, 47, 48, 114, 173/216, 217

[56] References Cited

U.S. PATENT DOCUMENTS

| | | | |
|---|---|---|---|
| 3,785,443 | 1/1974 | Armbruster | 173/48 |
| 3,799,275 | 3/1974 | Plattenhardt | 173/48 |
| 3,835,715 | 9/1974 | Howell | 74/22 |
| 4,073,348 | 2/1978 | Schramm et al. . | |
| 4,204,580 | 5/1980 | Nalley . | |
| 4,223,744 | 9/1980 | Lovingood . | |
| 4,232,749 | 11/1980 | Rohrbach . | |
| 4,325,436 | 4/1982 | Richter et al. . | |
| 4,418,766 | 12/1983 | Grossman | 173/13 |
| 4,446,931 | 5/1984 | Bleicher et al. . | |
| 4,798,249 | 1/1989 | Hoereth et al. . | |
| 5,159,986 | 11/1992 | Hoser . | |

*Primary Examiner*—Richard K. Seidel
*Assistant Examiner*—Jay A. Stelacone
*Attorney, Agent, or Firm*—Brooks & Kushman

[57] ABSTRACT

An adjusting mechanism for a hammer drill that will switch the drill from conventional drill only mode to a hammer drill mode by rotating an adjusting rod. The generally cylindrical adjusting rod includes an impact cam and an adjacent and smaller drill cam. One of the two cams will be in a position adjacent a thrust ball, which is on the back of the spindle. When the drill cam is rotated into position to contact the thrust ball, a clutch face on an output gear will be held in spaced relation to a clutch face on an impact bushing with a resulting drill only rotational motion of the spindle; when the impact cam is rotated into position adjacent the thrust ball, the two clutch faces will come into engagement with one another and create a hammer drill motion of the spindle.

6 Claims, 2 Drawing Sheets

DRILL ADJUSTMENT MECHANISM FOR A HAMMER DRILL

TECHNICAL FIELD

This invention relates to hammer drills and more particularly to adjustment mechanisms for switching between conventional drilling action and hammer drilling action on a hammer drill.

BACKGROUND ART

It is well known in the art to provide hammer drills with the capability to switch between a conventional drilling mode, with rotation only, and a hammer drilling mode employing conventional drill rotation along with a hammer action. The hammer drill is capable of switching between the two modes, and thus eliminates the need for a separate conventional drill.

U.S. Pat. No. 4,232,749 to Rohrbach discloses a hammer drill having a plastic selector slider oriented normal to the axis of drill rotation. The selector slider has ends that protrude from the drill housing on opposite sides, and it has a circular cut-out for a ball located midway between the ends. When the selector slider is pushed to one side, the ball abuts against the back end of a spindle, which limits the rearward axial travel of the spindle. This limit prohibits the spindle from moving back far enough for a ratchet, attached to the spindle, to engage a second ratchet and cause percussion motion. The hammer drill, therefore, operates only in a pure rotational drill mode. When the sliding rod is pushed in the other direction, the ball does not interfere with the spindle axial travel and thereby allows the engagement of the ratchets, with a resulting percussive drilling motion.

While this configuration will switch between the two modes, it has multiple pieces, which is more complicated than necessary and can add to assembly cost when a simple one piece switch design will do as well. It may also be easier for the operator to accidentally bump the switch and change modes when employing the side-to-side motion for switching than if the switch employed a different type of motion in which the operator must grip the switch to change modes. Further, the selector slider requires projections extending from it to limit its side-to-side travel and also latching elements that correspond to latching detents that must be added to the hammer drill housing in order to hold the selector slider in place, to try and avoid an inadvertent change between the two modes of operation.

Other switch configurations allow for a rotation of a handle to switch between the two modes, but use complicated configurations to achieve this result, which adds to the expense of fabrication and assembly of the hammer drill.

For the operator of the hammer drill, a simple and quick way to switch between the two modes, while not adding much weight or size to the overall unit, is desirable. The operator will also appreciate the drill remaining reliable and long lasting, with an adjustment switch for switching between the two modes that will last. Further, the purchaser of the hammer drill will want the switching capability to be an inexpensive mechanism, adding to the capabilities of the hammer drill while not being easy for the operator to inadvertently switch between the two modes of operation. To make the hammer drill inexpensive, the switching mechanism must be easy to fabricate and assemble into the overall hammer drill assembly.

Consequently, the need arises for a new switchable hammer drill that is simple to use as well as reliable, relatively lightweight and inexpensive and also will stay in the mode the operator of the drill chooses so that it will not change modes due to inadvertent contact of the adjustment switch by an operator of the drill.

DISCLOSURE OF INVENTION

The present invention includes a hammer drill for use in a conventional drill mode and a hammer drill mode. The hammer drill includes a drill housing having an armature shaft within it. The armature shaft has a first end, a second end and an axis of rotation and also includes a pinion at the first end. The hammer drill further includes a drive motor, coupled between the first and second ends of the armature shaft, for imparting a rotational motion to the armature shaft about its axis of rotation. A spindle assembly having a spindle shaft with an axis of rotation, is mounted within the housing. The spindle shaft has a first end, a second end, and a midsection therebetween, with the first end adapted to receive a drill chuck.

The spindle assembly further includes an output gear, fixed about the spindle shaft mid-section, that has a common axis of rotation with the spindle shaft. The output gear is rotationally engaged with and driven by the armature shaft pinion and has a first clutch face extending normal to the axis of rotation of the spindle shaft. An adjustment mechanism is fixed relative to the drill housing and includes a slidable bearing portion slidably mounted about the spindle between the output gear and the second end of the spindle shaft. An impact bushing portion is mounted about and fixed to the slidable bearing; the impact busing having a clutch face parallel to and facing the first clutch face in spaced relationship. A bearing member portion is fixed to the drill housing.

A generally cylindrical adjusting rod cooperates with the adjustment mechanism and is rotatably supported by the bearing member portion. A portion of the adjusting rod also forms a hand grip protruding from the drill housing. The adjusting rod also includes a drill cam and an impact cam, being deeper cut than the drill cam. The bearing portion of the adjustment mechanism alternately biases the cams to a position adjacent the second end of the spindle shaft, whereby the clutch faces will be engaged when the adjusting rod is rotated into a position such that the impact cam is adjacent the second end of the spindle shaft with slight clearance therefrom and the clutch faces will be in disengaged spaced relation when the rod is rotated such that the drill cam is oriented to contact the second end of the spindle shaft.

Accordingly, it is an object of this invention to provide an adjustment mechanism for use in a hammer drill that will quickly and easily switch between a conventional drilling mode and a hammer drilling mode by rotating an adjustment handle connected to an adjusting rod having a pair of cams for switching between the two modes.

It is further an object of this invention to provide an adjustment mechanism for use in a hammer drill that employs an adjustment rod having two cams that limit the axial travel of a spindle to different degrees and thereby determine in which mode the hammer drill will operate by limiting the engagement of a pair of clutch faces.

An advantage of the present invention is its simplicity and limited number of parts needed to accomplish the switching, which helps to ensure reliability and low cost.

The foregoing and other objects, features and advantages of the present invention are readily apparent from the following detailed description of the best mode for carrying out the invention when taken in connection with the accompanying drawings.

BEST MODES FOR CARRYING OUT THE INVENTION

A hammer drill employing a simple mechanism for switching between conventional drill action and hammer drill action by rotation of an adjustment rod is disclosed herein. The simple mechanism will ensure greater reliability and light weight while still allowing for quick and easy transition between the two modes of operation.

Figure 1:
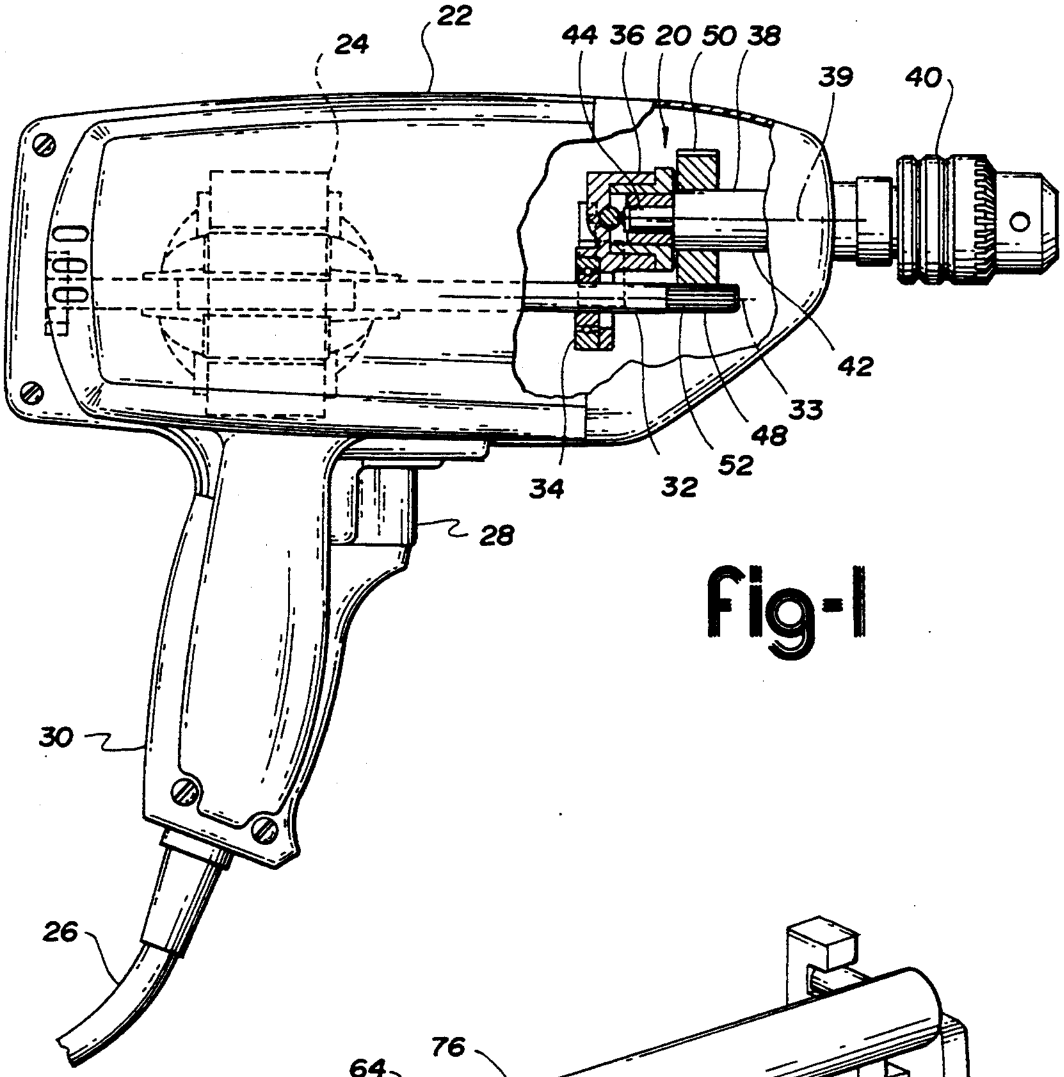
FIG. 1 is a side elevation view, in partial section, of a hammer drill in accordance with the present invention.

More specifically, FIG. 1 illustrates an adjustment mechanism 20 mounted within a hammer drill housing 22. Also mounted within the housing 22 is a drive motor 24. The housing 22 has a pistol grip handle 30, the lower end of which receives an electrical cord 26. The electrical cord 26 is adapted to be connected to a suitable power source that powers the motor 24. The cord 26 is in circuit with a trigger switch 28 on the handle 30 of the housing 22. The trigger switch 28 selectively supplies the power to the motor 24. A suitable speed control device (not shown) for controlling motor speed can also be included in a circuit connected to the trigger switch 28, if so desired.

The motor 24, connected toward the rearward end of an armature shaft 32, rotates the armature shaft 32 about its axis of rotation 33. The armature shaft 32 is supported on its front portion by a ball bearing 34. When referring to front and back herein, front refers to an element that is closer to the end of the drill that engages a work piece than another object. The ball bearing 34 is secured in place and supported by a bearing member 36 that mounts to the housing 22, which prevents it from moving relative to the housing 22. A spindle shaft 38, having an axis of rotation 39, includes a front portion 42 and a back portion 44. The front portion 42 protrudes from the housing 22 and attaches to a conventional chuck 40. The chuck 40 is adapted to retain a tool bit (not shown) that engages various work pieces.

Figure 2:
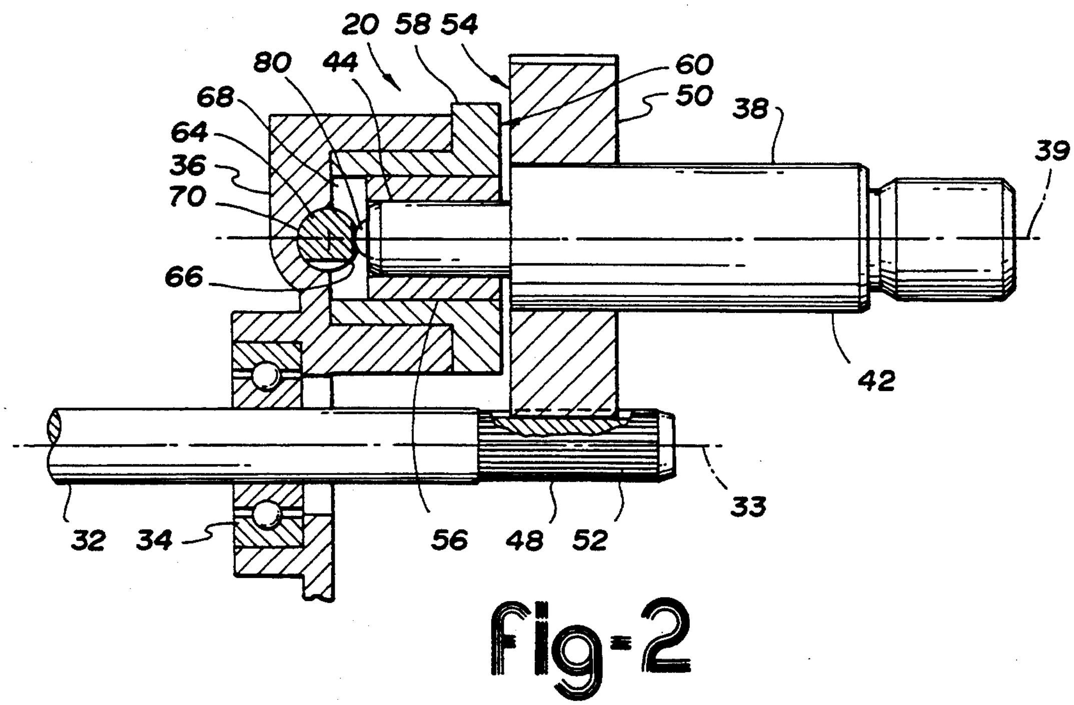
FIG. 2 is a side elevation view, on an enlarged scale and in partial section, of an adjustment mechanism in the conventional drill mode in accordance with the present invention.
Figure 3:
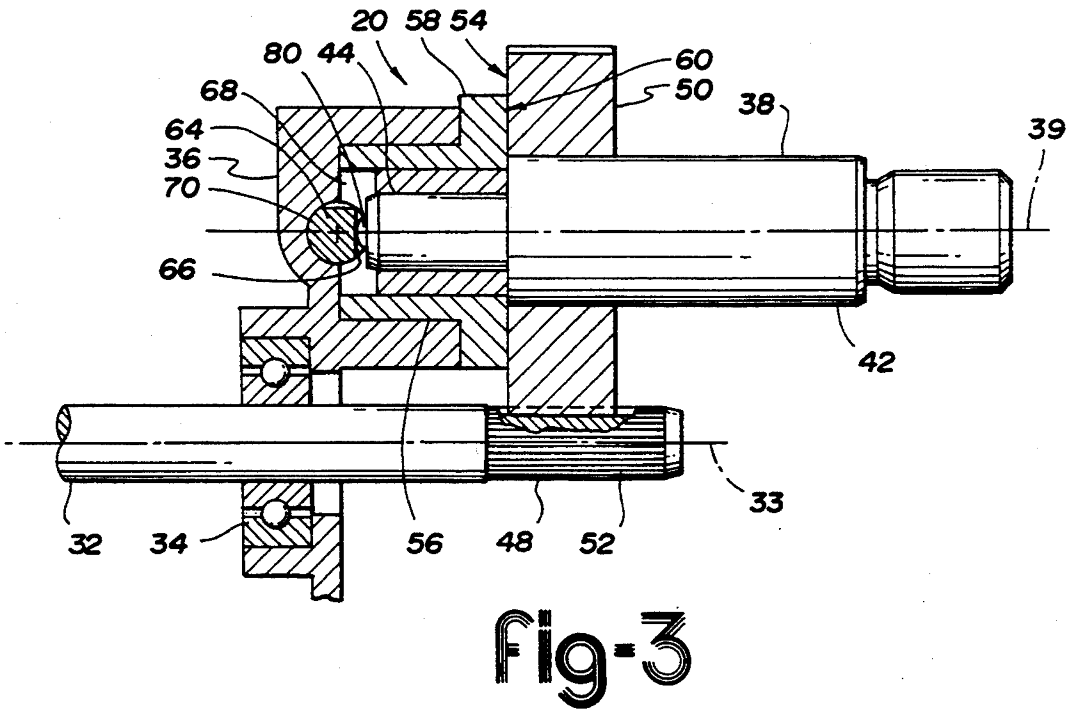
FIG. 3 is a side elevation view, on an enlarged scale and in partial section, of an adjustment mechanism in the hammer drill mode in accordance with the present invention.

Referring now to FIGS. 2 and 3, the adjustment mechanism 20 of the hammer drill is further illustrated. The armature shaft 32 includes an armature shaft pinion 48 near its front end. Intermeshed with the armature shaft pinion 48 is an output gear 50. The output gear 50 is fixed about the spindle 38, between the front portion 42 and the back portion 44. The teeth 52 of the armature shaft pinion 48 extend forward and backward beyond the width of the output gear 50 in order to allow a limited fore-aft motion of the output gear 50 relative to the pinion 48.

Slidably engaged about the back portion 44 of the spindle 38 is a sleeve bearing 56. The spindle 38 can move axially relative to the sleeve bearing 56. The spindle, therefore, may be axially shifted between a drill and a hammer position, and also is free to axially shift to allow the hammering action during the hammer mode of operation.

The back face 54 of the output gear 50 comprises a clutch face having annular angular teeth. Affixed between the bearing member 36 and the sleeve bearing 56 is a stationary impact bushing 58. This arrangement assures that the impact bushing 58 and the sleeve bearing 56 are fixed relative to the drill housing and therefore do not rotate with the spindle 38 or output gear 50. The front face 60 of the impact bushing 58 has annular clutch teeth that are aligned with the annular teeth of the output gear 50.

In the drill setting shown in FIGS. 1 and 2, the two sets of teeth are held in disengaged spaced relationship with each other and, consequently, the spindle 38 will only rotate when the armature shaft 32 drives the output gear 50. In the hammer drill setting, shown in FIG. 3, the spindle 38 is allowed to move back relative to the impact bushing 58 such that the teeth 54 of the output gear 46 will abut the corresponding teeth 60 of the impact bushing 58. When engaged, the corresponding teeth are angled to rotate forwardly when the armature shaft 32 drives the output gear 50, causing the teeth to continuously ride over and fall, producing the back and forth shifting, or hammering, effect.

An adjusting rod 64 is positioned within the adjustment mechanism 20. The adjusting rod 64 will allow or prevent the ratchet teeth from engaging with one another and, thus, determine the motion of the spindle 38. The impact bushing 58 includes a semi-cylindrical pivot hole 66 in its back side 68 oriented normal to the spindle axis 39. The bearing member 36 also includes a semi-cylindrical pivot hole 70 aligned and oriented with the impact bushing pivot hole 66. Together the two form a complete cylindrical pivot hole in which the adjusting rod 64 fits. The adjusting rod 64 fits within the complete pivot hole with only enough clearance to allow the rod 64 to rotate. This rotation is normal to the spindle axis of rotation 39.

Figure 4:
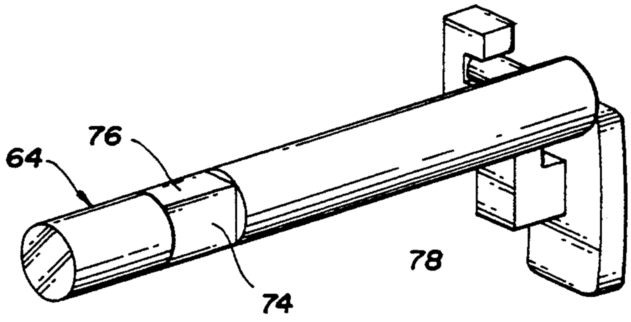
FIG. 4 is a perspective view, on an enlarged scale, of an adjusting rod in accordance with the present invention.

The adjusting rod 64 is further illustrated in FIG. 4. It has a generally cylindrical surface 72. The adjusting rod 64 includes two radially adjacent recesses within the cylindrical surface 72 of the rod 64, spaced from either end. In this embodiment, one is an impact cam 74 and the second is a drill cam 76, which is not recessed as deep as the impact cam 74. Each cam forms a chord about the cylinder of the rod 64, with the chords being adjacent and normal to one another, although they need not be chords or normal so long as the impact cam 74 is recessed deeper than the drill cam 76. Rod 64 is rotated by an operator between the two orientations shown in FIGS. 2 and 3 using slide button 78 which protrudes from drill housing 22.

As can be seen in FIGS. 1–3, the spindle 38 has a thrust ball 80 protruding from its back end. The orientation of the adjusting rod 64 is such that the drill cam 76 will always be in surface contact with the thrust ball 80 in the drill position. The impact cam 74 will have slight clearance from the thrust ball 80 in the impact position to assure full clutch face 54,60 engagement. FIG. 2 shows the thrust ball 80 in contact with the drill cam 76. The orientation of the adjusting rod 64 limits the rearward axial travel of the spindle 38 relative to the impact bushing 58 and, consequently, prevents the two clutch faces 54, 60 from engaging. Thus, when the armature pinion 44 drives the output gear 46, the spindle 38 will only experience a rotational motion.

When the adjusting rod 64 is rotated to orient the impact cam 74, which is deeper than the drill cam 76, in surface contact with the thrust ball 80, a backward axial shifting of the spindle 38 can take place and, consequently, the two sets of clutch teeth can engage. Thus, when the armature pinion 44 drives the output gear 46, the clutch teeth on the output gear 46 will rotate relative to the clutch teeth on the impact bushing 58, and the spindle 38 will then experience both a rotational and an axial hammer motion. Detents may be provided in the adjusting slide button 78 and outside the hammer drill housing 22 to maintain orientation of the adjusting rod 64.

While the best mode for carrying out the invention has been described in detail, those familiar with the art to which this invention relates will recognize various alternative designs and embodiments for practicing the invention as defined by the following claims.

What is claimed is:

1. A hammer drill for use in a conventional drilling mode and a hammer drilling mode comprising:

a drill housing;

an armature shaft within the housing having first and second ends and an axis of rotation, the armature shaft including a pinion at the first end;

a drive motor, coupled between the first and second ends of the armature shaft, for imparting a rotational motion to the armature shaft about its axis of rotation;

a spindle assembly mounted within the drill housing and having a spindle shaft with an axis of rotation, the spindle shaft having a first end, a second end, and a midsection therebetween, the first end adapted to receive a drill chuck; the spindle assembly further including an output gear fixed about the spindle shaft midsection having a common axis of rotation with the spindle shaft, the output gear rotationally engaged with and driven by the armature shaft pinion, the spindle assembly further having a first clutch face fixed about the spindle shaft midsection and extending normal to the axis of rotation of the spindle shaft;

an adjustment mechanism fixed relative to the drill housing including a bearing slidably mounted about the spindle shaft between the output gear and the second end of the spindle shaft, an impact bushing portion mounted about and fixed to the bearing and including a clutch face parallel to and facing the first clutch face in spaced relationship, and a bearing member portion fixed to the drill housing; and a generally cylindrical adjusting rod rotatably cooperating with the adjustment mechanism, the adjusting rod including a drill cam and an impact cam for alternately biasing the spindle shaft to a selected axial position, whereby the clutch faces will be engaged when the adjusting rod is rotated into a position such that the impact cam is oriented adjacent the second end of the spindle shaft and the clutch faces will be in disengaged spaced relation when the rod is rotated such that the drill cam is oriented to contact the second end of the spindle shaft.

2. The hammer drill of claim 1 wherein the drill cam and the impact cam are adjacent and normal to one another, and each are oriented about the adjusting rod to form a chord.

3. The hammer drill of claim 2 wherein the second end of the spindle shaft forms a semi-spherical protrusion, alternately cooperating with the drill cam and the impact cam.

4. The hammer drill of claim 1 wherein the adjusting rod has an axis of rotation normal to the spindle shaft axis of rotation.

5. The hammer drill of claim 1 wherein the output gear and the first clutch face are integral.

6. An adjusting mechanism for use in a hammer drill comprising:

a spindle assembly having a spindle shaft with an axis of rotation, the spindle shaft having a first end, a second end, and a midsection therebetween, the first end adapted to receive a drill chuck; the spindle assembly further including an output gear fixed about the spindle shaft midsection having a common axis of rotation with the spindle shaft and including a first clutch face extending normal to the axis of rotation of the spindle shaft;

an adjustment mechanism housing including a sleeve bearing slidably mounted about the spindle shaft between the output gear and the second end of the spindle shaft, an impact bushing fixedly closing and supporting the sleeve bearing and having a fixed clutch face parallel to and facing the first clutch face in spaced relationship, and a bearing member portion supporting the impact bushing and adapted to be fixed relative to the hammer drill; and a generally cylindrical adjusting rod having an axis of rotation normal to the spindle shaft axis of rotation and cooperating with the adjustment mechanism housing and rotatably supported by the bearing member portion, with the adjusting rod having a portion facilitating rotation of the adjusting rod by a user, the adjusting rod also including a drill cam adjacent and normal to a recessed impact cam, the bearing member portion of the adjustment mechanism including a pivot hole for supporting the adjusting rod and alternately biasing the cams into a position adjacent the second end of the spindle shaft, whereby the clutch faces will be engaged when the adjusting rod is rotated into a position such that the impact cam is adjacent the second end of the spindle shaft and the clutch faces will be in a disengaged spaced relation when the rod is rotated such that the drill cam is oriented to contact the second end of the spindle shaft.

* * * * *